United States Patent Office 3,282,845
Patented Nov. 1, 1966

3,282,845
MINERAL LUBRICATING OIL COMPOSITIONS CONTAINING COPOLYMERS OF ETHYLENE/STILBENE
William S. Anderson, Oakland, Calif., assignor to Shell Oil Company, New York, N.Y., a corporation of Delaware
No Drawing. Filed Dec. 9, 1963, Ser. No. 329,295
4 Claims. (Cl. 252—59)

This invention relates to new and novel copolymers of ethylene and stilbene and derivatives thereof for use as multifunctional materials and in compositions of matter.

It is known that individually stilbene or ethylene can be polymerized to form various products and articles of manufacture. Polymers of stilbene are rather low molecular weight materials which are rather thermally unstable and difficult to work with. Also, its use as additives in lubricants, rubber, coating materials is limited because of solubility and compatibility with these materials and compositions.

It has now been discovered that an excellent oxidatively and thermally stable high molecular polymer can be obtained by copolymerizing ethylene with stilbene under particular controlled conditions. These conditions are: (1) reacting the two monomers in the mol ratio of 1:10 to 10:1 preferably 2:1 to 5:1 of ethylene to stilbene, (2) under high pressure of from 5000 p.s.i. to 100,000, p.s.i. (3) at between —40° C. and 50° C., preferably between —20° C. and 25° C., (4) in the presence of solvent mixtures of certain oxygen-containing or nitrogen containing compounds and hydrocarbons, and (5) in the presence of an organo lithium catalyst such as an alkyl or aryl lithium compound. The copolymers of this invention have a plurality of units represented by the formula:

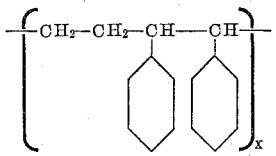

where $x$ is an integer so that the total units making up the copolymer ranges in molecular weight of from about 1000 to about 1,000,000, preferably between 2500 and 600,000 as determined by the light scattering method and the intrinsic viscosity ranging from 0.15 to 2, preferably between 0.1 and 1.5 dl./gram.

The new and novel copolymers of the present invention are prepared by copolymerizing stilbene and ethylene in the presence of a suitable solvent and an organo lithium catalyst at a temperature range from about —50° C. to 50° C. and at a pressure between 5,000 p.s.i. and 100,000 p.s.i.

By suitable liquid solvent mixtures made reference to in column 1, item 4, is meant mixture of from 10% to 90% of certain oxygen-containing compounds such as dimethyl ether, diethyl ether, dioxane, diethyl ether of diethylene glycol, tetrahydrofuran, diphenylene oxide, or nitrogen compounds such as triethylamine or triethylenediamine or sulfur containing compounds such as diethyl sulfide, tetrahydrothiophene etc., and from 90% to 10% of an aromatic hydrocarbon such as benzene or toluene or the like.

The catalyst may be an organo lithium such as an alkyl or aryl lithium compound, e.g. ethyl or normal or branched butyl, octyl lithium or phenyl or naphthyl lithium or mixtures thereof. The catalyst may also be a dilithio compound such as the lithium adduct of 1,1-diphenyl ethylene, or of stilbene or of alpha-methyl styrene or may also be an aliphatic dilithio compound such as 1,5-dilithio pentane, 1,6-dilithio hexane, etc.

The use of other types of catalysts such as the Friedel-Crafts catalyst or Ziegler type catalysts or other alkali metal catalysts, e.g. sodium or mixtures thereof with or without the presence of the above-mentioned solvents and under different pressure and temperature conditions from that of the present invention results in a different end product from the one made by the process of the present invention. Particular advantages of the polymer of the present invention are their rigidity and high impact strength. The following examples are illustrative of the present invention.

Example 1

A mixture of about 1 part of stilbene and 5 parts ethylene were introduced into a pressure vessel containing about a 50–50 mixture of tetrahydrofuran and toluene. The entire mixture is reacted under pressure of 11,800–6,600 p.s.i. and at a temperature of around 0° C.–5° C. in the presence of 0.01 mole butyl lithium catalyst for 1–24 hours, until the copolymer reaction indicated the stilbene content to be essentially unchanged. The stilbene content of the copolymer was around 20–30% and the molecular weight of the copolymer was between 10,000 and 100,000.

Following essentially the above procedure other copolymers of the present invention were prepared as shown in Table I.

TABLE I

| Example [1] | Stilbene, Mol Percent | Ethylene, Mol Percent | Reaction Temp., °C. | Reaction Pressure | Reaction Time, Hr. | Mol wt. (Ebul.) |
|---|---|---|---|---|---|---|
| II | 35 | 65 | 0 to +5 | 11,800-6,600 | 10 | 5,000 |
| III | 25 | 75 | 10-15 | 13,700-9,400 | 5 | 2,500 |
| IV | 75 | 25 | 10-20 | 13,500-9,200 | 24 | 4,800 |
| V | 30 | 70 | 0-10 | 15,000-1,000 | 24 | 10,000 |

[1] II. Solvent=50/50 mixture of tetrahydrofuran and toluene, Catalyst=Butyl lithium (0.1%). III. Solvent=10/10 mixture of tetrahydrofuran and benzene, Catalyst=Butyl lithium (0.1%). IV. Solvent=50/20 mixture of tetrahydrofuran and benzene, Catalyst=Butyl lithium (0.1%). V. Solvent=50/50 mixture of diethyl ether and toluene, Catalyst=lithium naphthene (0.1%).

Although the oil-solubility of these copolymers are marginal, their solubility and lubricating oil-additive properties can be greatly improved by alkylation of the copolymer so as to introduce long alkyl radicals having from 10 to over 30 carbon atoms. Alkylation of the copolymer can be accomplished by reacting the copolymer in a suitable solvent such as alkyl halides, e.g. ethyl chloride; nitroaromatics, e.g. nitrobenzene or carbon disulfide and the like, with long chain olefins such as polyisobutylene, or $C_{10-30}$ alkyl halides or acetyl halides such a lauryl, oleyl, stearyl chlorides and the like. The reaction can be carried out as from —50° C. to 20° C. and the reaction time varies from 1 to 24 hours.

For example, the copolymer of Example III was added to nitrobenzene, agitated and 20% of polyisobutylene (M.W. 1500) slowly added thereto and the temperature maintained at —10 to —20° C. for about 5 hours. The end product (Ex. IIIA) contained units represented by the formulas:

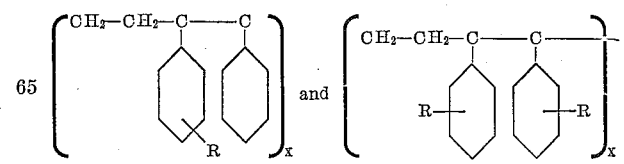

where R is polyisobutylene radical.

Another way of increasing oil solubility is to hydrogenate the copolymer and this can be accomplished by dissolving the copolymer, e.g. Ex. I–V in a hydrocarbon solvent such as cyclohexane and hydrogenating the copolymer at 125–200° C. and 500–1000 p.s.i. in the presence of a suitable catalyst such as platinum.

For example, the copolymer of Ex. I was dissolved in cyclohexane and hydrogenated at 150–175° C., and 500–800 p.s.i. pressure in the presence of platinum catalyst for about 5–10 hours. About 60–75% of the aromatic units in polymer were hydrogenated. The hydrogenated copolymer (Ex. IA) was soluble in mineral oil to −20° C. and lower whereas the unhydrogenated polymer was not soluble at these low temperatures. The hydrogenated copolymer imparts pour point and viscosity index (V.I.) improving properties to mineral lubricating oil. Thus, a mineral lubricating oil having a pour point of +20 and a V.I. of 50 was improved by addition thereto of 5% of hydrogenated copolymer (Ex. IA) so that the oil composition has a pour point of −20° C. and a V.I. of 110.

When desired, additional improvement with respect to oxidation stability and scuffing inhibition can be imparted to the oil compositions containing the copolymers of this invention by incorporating small amounts (0.01%–2%, preferably 0.1%–1%) of phenolic antioxidants such as alkylphenols, e.g. 2,6-ditertbutyl-4-methylphenol or p,p'-methylene bisphenols such as 4,4'-methylene bis(2,6-ditertbutyl phenol) or arylamines such as phenyl-alpha-naphthylamine, dialkyl sulfides and mixtures thereof, e.g. dibenzyl disulfide, didodecyl sulfide. Anti-scuffing agents include organic phosphites, phosphates, phosphonates and their thio-derivatives, such as $C_{3-18}$ alkyl phosphites, or phosphonates, e.g. di- and tributyl, octyl, lauryl, stearyl, cyclohexyl, benzyl, cresyl, phenyl, phosphites or phosphates, as well as their thio-derivatives, $P_2S_5$-terpene reaction products, e.g. $P_2S_5$-pine oil reaction product and alkali metal salts thereof such as a potassium salt of a $P_2S_5$-terpene reaction product, phosphonates such as dibutyl methanephosphonate, dibutyl trichloromethanephosphonate, dibutyl monochloromethanephosphonate, dibutyl chlorobenzenephosphonate, and the like. The full esters of pentavalent phosphorus acids such as triphenyl, tricresyl, trilauryl and tristearyl ortho-phosphates or potassium salt of $P_2S_5$-terpene reaction product are preferred.

The polymeric additives of this invention improve various mineral oil products by the incorporation of a minor amount (0.01% to 5%, preferably 0.1% to 3% by weight) of the additive. Thus, they may be used to improve transformer oils, turbine oils, hydraulic fluids, mineral lubricating oils, industrial oils and the like. Suitably such lubricating oils range from SAE 5W viscosity grade to SAE 140 grade and are derived from paraffinic, naphthenic or asphaltic base crudes. Representative oils are refined high viscosity index mineral oils having a viscosity at 100° C. of from 100 to 250 SUS.

Copolymers of the present invention possess excellent thermal stability properties.

Copolymers of the present invention are compatible with waxes, rubber (natural and synthetic), moldable resins, ion exchange resins and can be used in radiation resistant oil, greases, plastics, dielectrics, optical goods, synthetic leather, drilling muds, lubricants and the like.

I claim as my invention:

1. A mineral lubricating oil composition comprising a major amount of mineral lubricating oil and from 0.01% to 5% of an oil-soluble copolymer of ethylene and stilbene obtained by reacting said monomers in the mole ratio of 1:10 to 10:1 respectively, between −40° C. and 50° C., at a pressure of from 5,000 to 100,000 p.s.i., in the presence of an organo lithium catalyst and a solvent mixture of an aromatic hydrocarbon and a polar-containing compound selected from the group consisting of an oxygen-containing compound and a nitrogen-containing compound, said copolymer having a molecular weight of from about 1,000 to about 1,000,000.

2. The composition of claim 1 wherein the copolymer is obtained under the following reaction conditions: mole ratio of ethylene to stilbene being from 2:1 to 5:1 respectively, the reaction temperature being between −20° C. and 25° C., the catalyst being butyl lithium and the solvent mixture being a 50–50 mixture of tetrahydrofuran and toluene and the molecular weight being 2,500 to 600,000.

3. The composition of claim 2 wherein the copolymer is alkylated.

4. The composition of claim 2 wherein the copolymer is alkylated with polyisobutylene.

References Cited by the Examiner

UNITED STATES PATENTS

| | | | |
|---|---|---|---|
| 2,478,843 | 8/1949 | Seymour et al. | 252—59 |
| 2,563,631 | 8/1951 | Young et al. | |
| 2,615,004 | 10/1952 | Jasper et al. | 252—59 X |
| 2,798,853 | 7/1957 | Young et al. | 252—59 X |
| 2,850,488 | 9/1958 | Baxter et al. | 260—88.2 |
| 2,883,372 | 4/1959 | Stamatoff | 260—88.2 |
| 3,057,801 | 10/1962 | Wilgus | 252—59 |
| 3,156,736 | 11/1964 | Southern et al. | 252—59 X |
| 3,203,898 | 8/1965 | Harris | 252—59 |

FOREIGN PATENTS 497,643  12/1938  Great Britain.

DANIEL E. WYMAN, *Primary Examiner.*

W. H. CANNON, *Assistant Examiner.*